(12) United States Patent
Badawiyeh et al.

(10) Patent No.: US 12,309,440 B2
(45) Date of Patent: May 20, 2025

(54) OPTIMIZED AD PLACEMENT BASED ON AUTOMATED VIDEO ANALYSIS AND DEEP METADATA EXTRACTION

(71) Applicant: Charter Communications Operating, LLC, St. Louis, MO (US)

(72) Inventors: Basil Badawiyeh, Parker, CO (US); Vipul Patel, Great Falls, VA (US); Gary Schanman, Cherry Hills Village, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 197 days.

(21) Appl. No.: 16/230,830

(22) Filed: Dec. 21, 2018

(65) Prior Publication Data
US 2020/0204838 A1  Jun. 25, 2020

(51) Int. Cl.
*H04N 21/234* (2011.01)
*G06N 20/00* (2019.01)
*G06Q 30/0251* (2023.01)
*H04N 21/235* (2011.01)
*H04N 21/4545* (2011.01)

(52) U.S. Cl.
CPC ....... *H04N 21/23424* (2013.01); *G06N 20/00* (2019.01); *G06Q 30/0269* (2013.01); *H04N 21/2353* (2013.01); *H04N 21/45457* (2013.01)

(58) Field of Classification Search
CPC .......... H04N 21/23424; H04N 21/84; H04N 21/23431; H04N 21/23605; H04N 21/4333; H04N 21/6582; H04N 21/8193; H04N 21/812

USPC ................... 725/34, 105, 112, 113
See application file for complete search history.

(56) References Cited

U.S. PATENT DOCUMENTS

| | | | |
|---|---|---|---|
| 7,792,963 B2 | 9/2010 | Gould et al. | |
| 8,332,885 B2 | 12/2012 | Williamson et al. | |
| 8,819,727 B2 | 8/2014 | Williamson et al. | |
| 8,826,347 B1 | 9/2014 | Earle | |
| 8,869,207 B1 | 10/2014 | Earle | |
| 8,910,198 B2 | 12/2014 | Kelsen et al. | |
| 8,995,427 B1* | 3/2015 | Barbulescu | G06Q 30/0277 370/352 |
| 9,027,065 B2 | 5/2015 | Earle | |
| 9,124,928 B2 | 9/2015 | Kelsen et al. | |

(Continued)

OTHER PUBLICATIONS

Society of Cable Telecommunications Engineers (SCTE), American National Standard ANSI/SCTE 35 2017, 2017, 75 pages, https://www.scte.org/SCTEDocs/Standards/ANSI_SCTE%2035%202017.pdf.

(Continued)

*Primary Examiner* — Nasser M Goodarzi
(74) *Attorney, Agent, or Firm* — Otterstedt & Kammer PLLC

(57) ABSTRACT

In one aspect, an exemplary method for dynamic advertising insertion includes obtaining a video program comprising a sequence of segments; extracting metadata describing at least a specific one of the segments of the video program; based at least in part on the extracted metadata describing the specific segment, selecting advertising content corresponding to the specific segment; and generating an output video stream comprising the sequence of segments, wherein the selected advertising content is displayed in connection with the specific segment.

17 Claims, 11 Drawing Sheets

(56) References Cited

U.S. PATENT DOCUMENTS

| | | | |
|---|---|---|---|
| 9,241,179 | B2 | 1/2016 | Earle |
| 9,521,459 | B2 | 12/2016 | Earle |
| 2003/0056217 | A1 | 3/2003 | Brooks |
| 2006/0130107 | A1 | 6/2006 | Gonder et al. |
| 2007/0217436 | A1 | 9/2007 | Markley et al. |
| 2007/0280215 | A1 | 12/2007 | Gilbert et al. |
| 2008/0013724 | A1* | 1/2008 | Shamoon ......... H04N 21/44055 380/201 |
| 2008/0112690 | A1* | 5/2008 | Shahraray .............. H04N 21/47 386/262 |
| 2008/0172293 | A1* | 7/2008 | Raskin ................... G06Q 10/04 705/14.1 |
| 2008/0294577 | A1* | 11/2008 | Agarwal ................ G06Q 10/00 706/12 |
| 2009/0248794 | A1 | 10/2009 | Helms |
| 2010/0313236 | A1 | 12/2010 | Straub |
| 2012/0143696 | A1 | 6/2012 | Kaushik et al. |
| 2015/0058883 | A1 | 2/2015 | Tidwell et al. |
| 2015/0058884 | A1 | 2/2015 | Eldering et al. |
| 2015/0281776 | A1 | 10/2015 | Desai et al. |
| 2016/0359937 | A1* | 12/2016 | Chung ................ H04L 65/4069 |
| 2017/0006317 | A1 | 1/2017 | LaJoie et al. |
| 2017/0055039 | A1 | 2/2017 | Earle |
| 2019/0075339 | A1* | 3/2019 | Smith .................. H04N 21/858 |

OTHER PUBLICATIONS

Melissa Gallo, Interactive Advertising Bureau (IAB), Taxonomy: The Most Important Industry Initiative You've Probably Never Heard Of, Jul. 20, 2016, 3 pages, https://www.iab.com/news/taxonomy-important-industry-initiative-youve-probably-never-heard/.

Kevin Flood et al., Interactive Advertising Bureau (IAB), IAB Tech Lab Announces Final Content Taxonomy v2 Ready for Adoption, Nov. 30, 2017, 2 pages, https://iabtechlab.com/blog/iab-tech-lab-announces-final-content-taxonomy-v2-ready-for-adoption/.

Interactive Advertising Bureau (IAB), Context Taxonomy version 2.0 final release, Nov. 2017, 13 pages, http://labtechlab.com/wp-content/uploads/2017/11/IAB_Tech_Lab_Content_Taxonomy_V2_Final_2017-11.xlsx.

Interactive Advertising Bureau (IAB), Data Transparency Standards for Public Comment, May 2018, 24 pages, https://labtechlab.com/wp-content/uploads/2018/05/IAB-Tech-Lab-Data-Transparency-Framework-Public-Comment.pdf.

Interactive Advertising Bureau (IAB), Audience Taxonomy 1.0 public comment release, May 2018, 9 pages, https://labtechlab.com/wp-content/uploads/2018/05/IAB-Tech-Lab-Audience-Taxonomy-1.0-Public-Comment.xlsx.

International Press Telecommunications Council (IPTC), NewsCodes, 2018, 3 pages, https://iptc.org/standards/subject-codes/.

International Press Telecommunications Council (IPTC), NewsCodes, 2018, 3 pages, https://iptc.org/standards/newscodes/.

International Press Telecommunications Council (IPTC), NewsCodes Concept: Subject Code, 2018, 274 pages, http://cv.iptc.org/newscodes/subjectcode/.

International Press Telecommunications Council (IPTC), NewsCodes Concept: Subject Qualifier, 2018, 10 pages, http://cv.iptc.org/newscodes/subjectqualifier/.

International Press Telecommunications Council (IPTC), NewsCodes Concept: Media Topic, 2018, 237 pages, http://cv.iptc.org/newscodes/mediatopic/.

International Press Telecommunications Council (IPTC), NewsCodes Concept: Genre, 2018, 9 pages, http://cv.iptc.org/newscodes/genre/.

International Press Telecommunications Council (IPTC), NewsCodes Concept: Product Genre, 2018, 3 pages, http://cv.iptc.org/newscodes/productgenre/.

International Press Telecommunications Council (IPTC), NewsCodes Concept: Nature of a Concept, 2018, 2 pages, http://cv.iptc.org/newscodes/cpnature/.

International Press Telecommunications Council (IPTC), NewsCodes Concept: Content Warning, 2018, 2 pages, http://cv.iptc.org/newscodes/contentwarning/.

Mike Waldron, Aylien Ltd., IAB QAG Tagging is here; Semantic Targeting Made Easy, Sep. 17, 2015, 7 pages, http://blog.aylien.com/iab-qag-tagging-is-here-semantic-targeting-made/.

Will Gannon, Aylien Ltd., Which taxonomy should you use to classify news content, IAB-QAG or IPTC Subject Codes?, Nov. 12, 2018, 9 pages, http://blog.aylien.com/which-taxonomy-should-you-use-to-classify-news-content-iab-qag-or-iptc-subject-codes/.

Aylien Ltd., Text Classification, 2018, 4 pages, https://aylien.com/text-api/text-classification/.

Blanca Galego, MeaningCloud, Text Analytics & MeaningCloud 101, Feb. 14, 2017, 5 pages, https://www.meaningcloud.com/blog/text-analytics-meaningcloud-101.

Antonio Matarranz, MeaningCloud, Automatic IAB tagging enables semantic ad targeting, Jun. 13, 2016, 3 pages, https://www.meaningcloud.com/blog/automatic-iab-tagging-enables-semantic-ad-targeting.

Luca De Filippis, MeaningCloud, Updated version of the IAB model in the Deep Categorization API, Mar. 19, 2018, 2 pages, https://www.meaningcloud.com/blog/updated-iab-model-meaningcloud.

Cable Television Laboratories, Inc., CableLabs Video-On-Demand Content Specification Version 1.1, Aug. 3, 2012, 67 pages, https://specification-search.cablelabs.com/cablelabs-video-on-demand-content-specification-version-1-1.

Cable Television Laboratories, Inc., CableLabs Content Specification Version 3.0, Nov. 4, 2015, 33 pages, https://specification-search.cablelabs.com/cablelabs-content-3-0-specification.

Cable Television Laboratories, Inc., Genre and Show Type Classification Document, Aug. 2010, 10 pages, http://mibs.cablelabs.com/namespaces/metadata/lists/genre_classification_list.pdf.

Motion Picture Laboratories, Inc., Common Metadata Version 2.7, Nov. 1, 2018, 120 pages, http://www.movielabs.com/md/md/v2.7/Common_Metadata_v2.7.pdf.

Motion Picture Laboratories, Inc., Common Media Manifest Metadata Version 1.8, Nov. 1, 2018, 107 pages, http://www.movielabs.com/md/manifest/v1.8/Manifest_v1.8.pdf.

Motion Picture Laboratories, Inc., Media Manifest Delivery Core Version 2.0, Nov. 19, 2018, 38 pages, http://www.movielabs.com/md/mmc/v2.0/Manifest_Core_v2.0.pdf.

Motion Picture Laboratories, Inc., Media Entertainment Core Metadata Version 2.6, Dec. 11, 2017, 13 pages, http://www.movielabs.com/md/mec/v2.6/Media_Ent_Core_Metadata_v2.6.pdf.

Entertainment Identifier Registry (EIDR), EIDR System Version 2.0.9 Data Fields Reference, Dec. 27, 2015, 95 pages, http://eidr.org/documents/EIDR_2.0_Data_Fields.pdf.

Society of Motion Picture and Television Engineers (SMPTE), SMPTE Standard ST 377-1:2011, Jun. 7, 2011, 183 pages, https://ieeexplore.ieee.org/document/7292073.

Society of Motion Picture and Television Engineers (SMPTE), SMPTE Engineering Guideline EG 377-3:2013, Jan. 29, 2013, 47 pages, https://ieeexplore.ieee.org/document/7291302.

Society of Motion Picture and Television Engineers (SMPTE), SMPTE Engineering Guideline EG 42:2015, Aug. 30, 2015, 26 pages, https://ieeexplore.ieee.org/document/7395464.

Society of Motion Picture and Television Engineers (SMPTE), SMPTE Standard ST 2102:2017, Oct. 23, 2017, 30 pages, https://ieeexplore.ieee.org/document/8126304.

Consumer Technology Association (CTA), Standard CTA 2033 R2016, Mar. 2008, 102 pages.

European Committee for Standardization (CEN), European Standard EN 15907:2010(E), Jul. 2010, 36 pages.

European Broadcasting Union (EBU), EBU Core Metadata Set, Tech 3293, Version 1.8, Oct. 2017, 41 pages, https://tech.ebu.ch/docs/tech/tech3293.pdf.

International Organization for Standardization (ISO), International Standard ISO 15706:2002(E), Nov. 15, 2002, 20 pages.

International Organization for Standardization (ISO), International Standard ISO/IEC 15938-5:2003(E), May 15, 2003, 738 pages.

International Organization for Standardization (ISO), International Standard ISO/IEC 21000-2:2005(E), Oct. 1, 2005, 96 pages.

(56) References Cited

OTHER PUBLICATIONS

International Organization for Standardization (ISO), International Standard ISO/IEC 21000-3:2003(E), Apr. 1, 2003, 38 pages.
International Organization for Standardization (ISO), International Standard ISO/IEC 21000-3:2003/Amd.1:2007(E), Feb. 1, 2007, 14 pages.
Content ID Forum (cIDF), cIDf Specification 2.0 Rev. 1.1, Apr. 1, 2007, 148 pages, http://www.npo-ba.org/cid/CIDfSpecV2R11E.pdf.
Content ID Forum (cIDF), cIDf Specification 2.0 Rev. 1.1 Appendices, Apr. 1, 2007, 75 pages, http://www.npo-ba.org/cid/cIDfSpecV2R11AE.pdf.

\* cited by examiner

500

600

OPTIMIZED AD PLACEMENT BASED ON AUTOMATED VIDEO ANALYSIS AND DEEP METADATA EXTRACTION

FIELD OF THE INVENTION

The present invention relates generally to the electrical, electronic, and computer arts, and more particularly relates to analysis and processing of video content.

BACKGROUND OF THE INVENTION

Displaying irrelevant advertisements to end users (e.g., viewers) of content can be viewed as a waste of the users' time and the advertisers' money. Hence, the content distribution and advertising industries have sought to provide users with more relevant (e.g., targeted) advertising. Current technologies include targeting advertisements based on content genre, geographic zones and/or user demographics (e.g., age, gender, etc.)

However, content metadata typically describes a program (e.g., a movie or an episode of a television series) as a whole, rather than individual scenes within the program. Thus, the advertisements shown to a user may not correspond to the specific content which the user is watching at that moment. By way of example, it would be preferable to display an advertisement for an airline during a scene of a romantic comedy movie in which a smiling newlywed couple lands at an exotic destination to start their honeymoon, rather than a preceding scene within the same movie in which those newlyweds are worried about missing their flight while going through airport security.

SUMMARY OF THE INVENTION

In one aspect, an exemplary method for dynamic advertising insertion includes obtaining a video program comprising a sequence of segments; extracting metadata describing at least a specific one of the segments of the video program; based at least in part on the extracted metadata describing the specific segment, selecting advertising content corresponding to the specific segment; and generating an output video stream comprising the sequence of segments, wherein the selected advertising content is displayed in connection with the specific segment.

In another aspect, an exemplary method for dynamic advertising insertion includes obtaining a video program comprising a sequence of segments with respective cues therebetween; obtaining metadata describing at least a given segment of the video program; using the metadata describing the given segment to select advertising content corresponding to the given segment; and replacing a cue within the video program following the given segment with the selected advertisement content corresponding to the given segment.

In still another aspect, an exemplary system for dynamic advertising insertion includes a memory and at least one processor coupled to the memory. The processor is operative: to obtain a video program comprising a sequence of segments; to extract metadata describing at least a specific one of the segments of the video program; based at least in part on the extracted metadata describing the specific segment, to select advertising content corresponding to the specific segment; and to generate an output video stream comprising the sequence of segments, wherein the selected advertising content is displayed in connection with the specific segment.

In a further aspect, a computer program product includes a non-transitory machine-readable storage medium having machine-readable program code embodied therewith. The machine-readable program code includes machine-readable program code configured: to obtain a video program comprising a sequence of segments; to extract metadata describing at least a specific one of the segments of the video program; based at least in part on the extracted metadata describing the specific segment, to select advertising content corresponding to the specific segment; and to generate an output video stream comprising the sequence of segments, wherein the selected advertising content is displayed in connection with the specific segment.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide metadata describing particular scenes or segments within video content. This metadata can be used to select advertisements which are relevant to the specific content which a user is presently viewing.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville CO 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband. IP-based data services may be provided over a variety of networks. Purely by way of example and not limitation, some embodiments will be shown in the context of a cable multi-service operator (MSO) providing data services as well as entertainment services.

Figure 1:
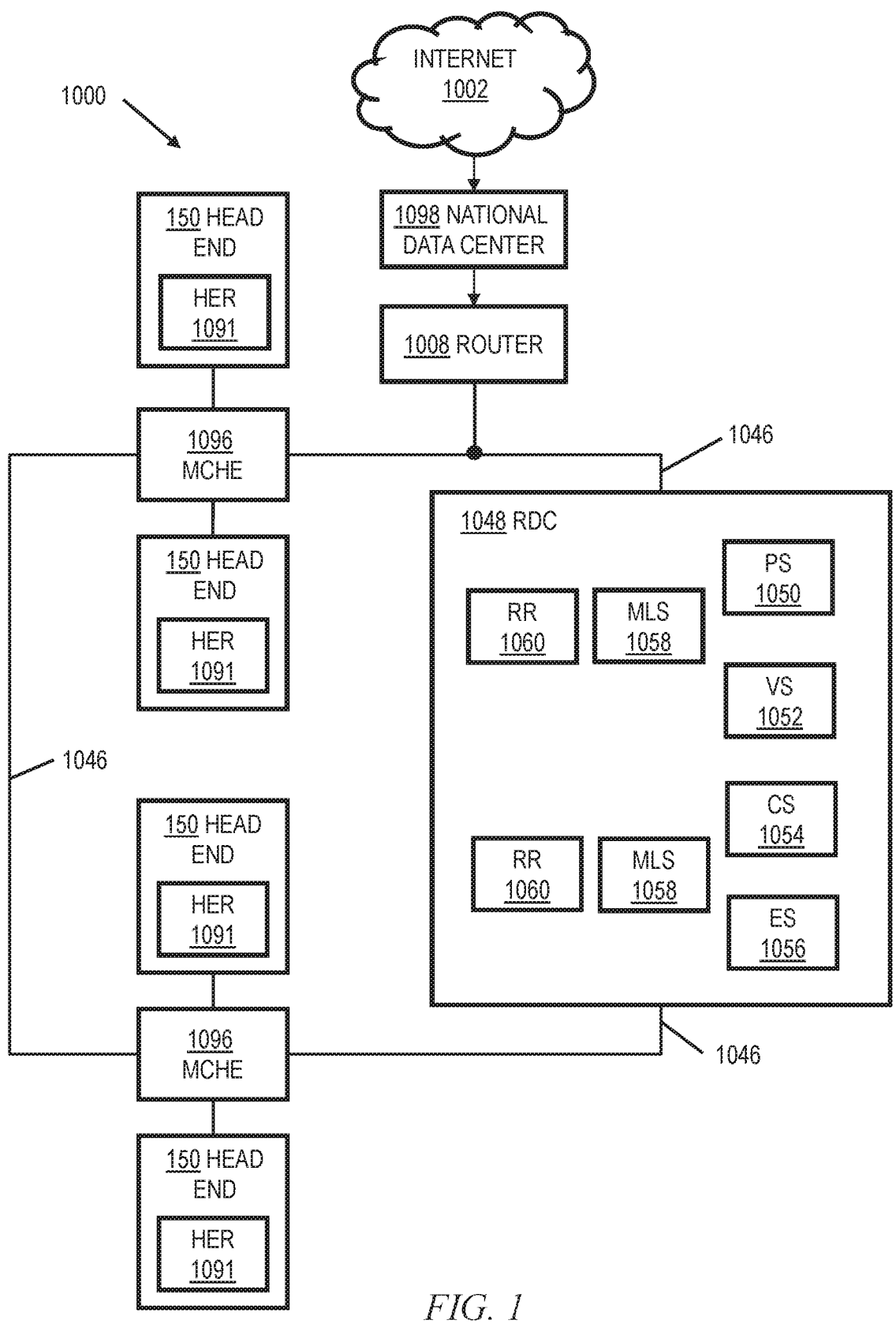
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
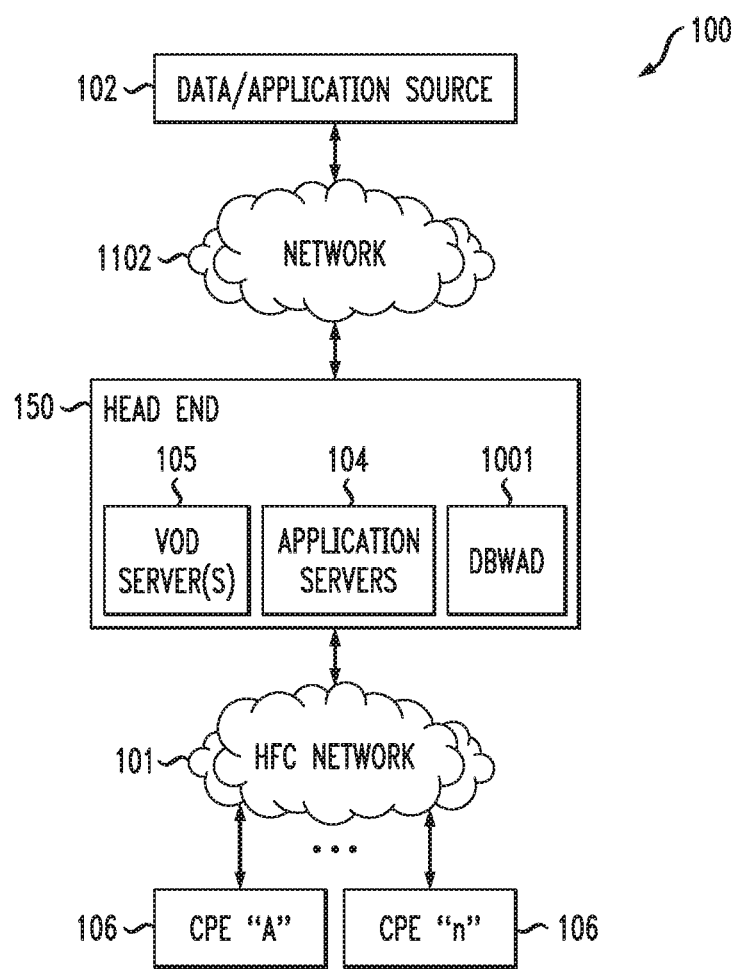
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes.

The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
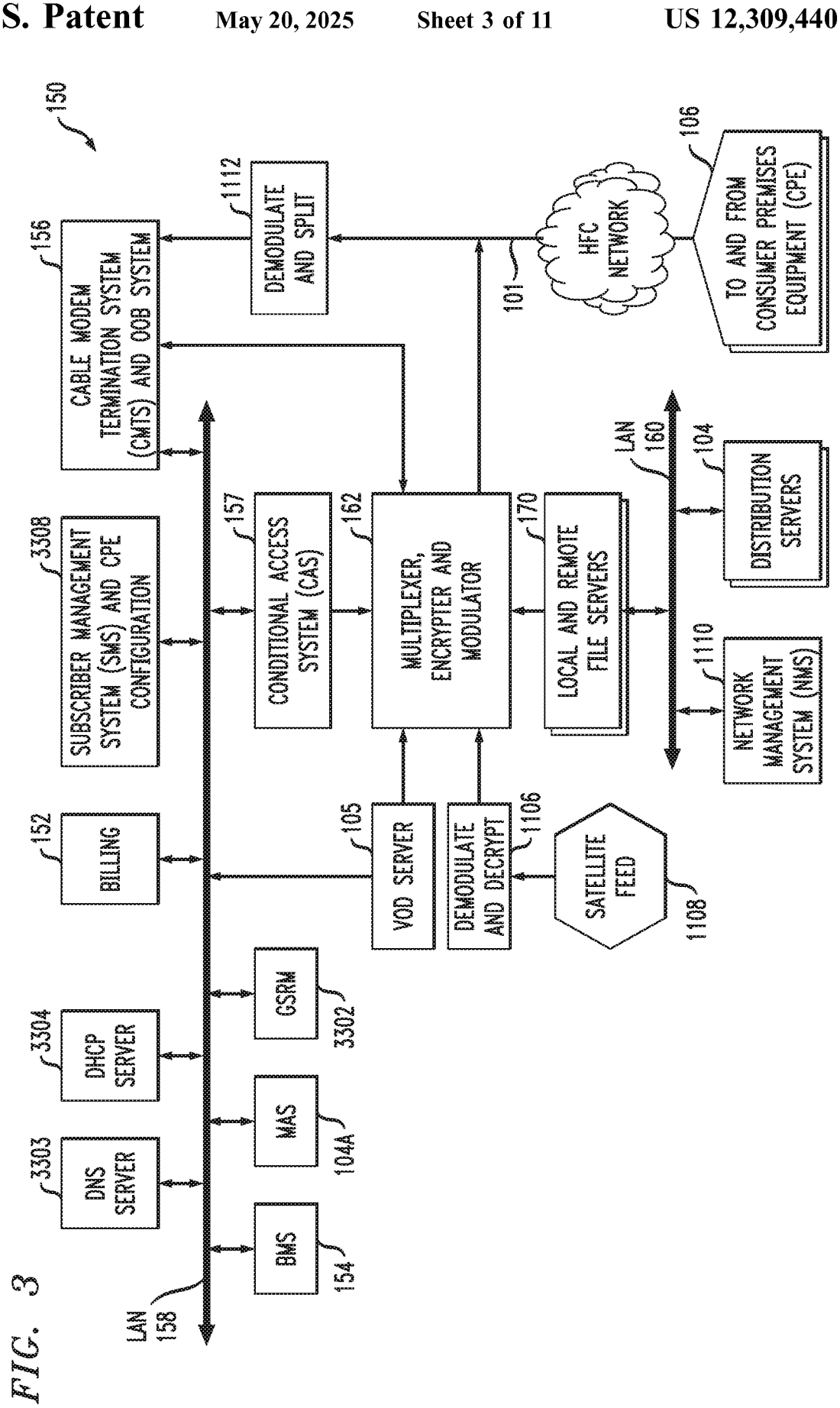
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager. An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
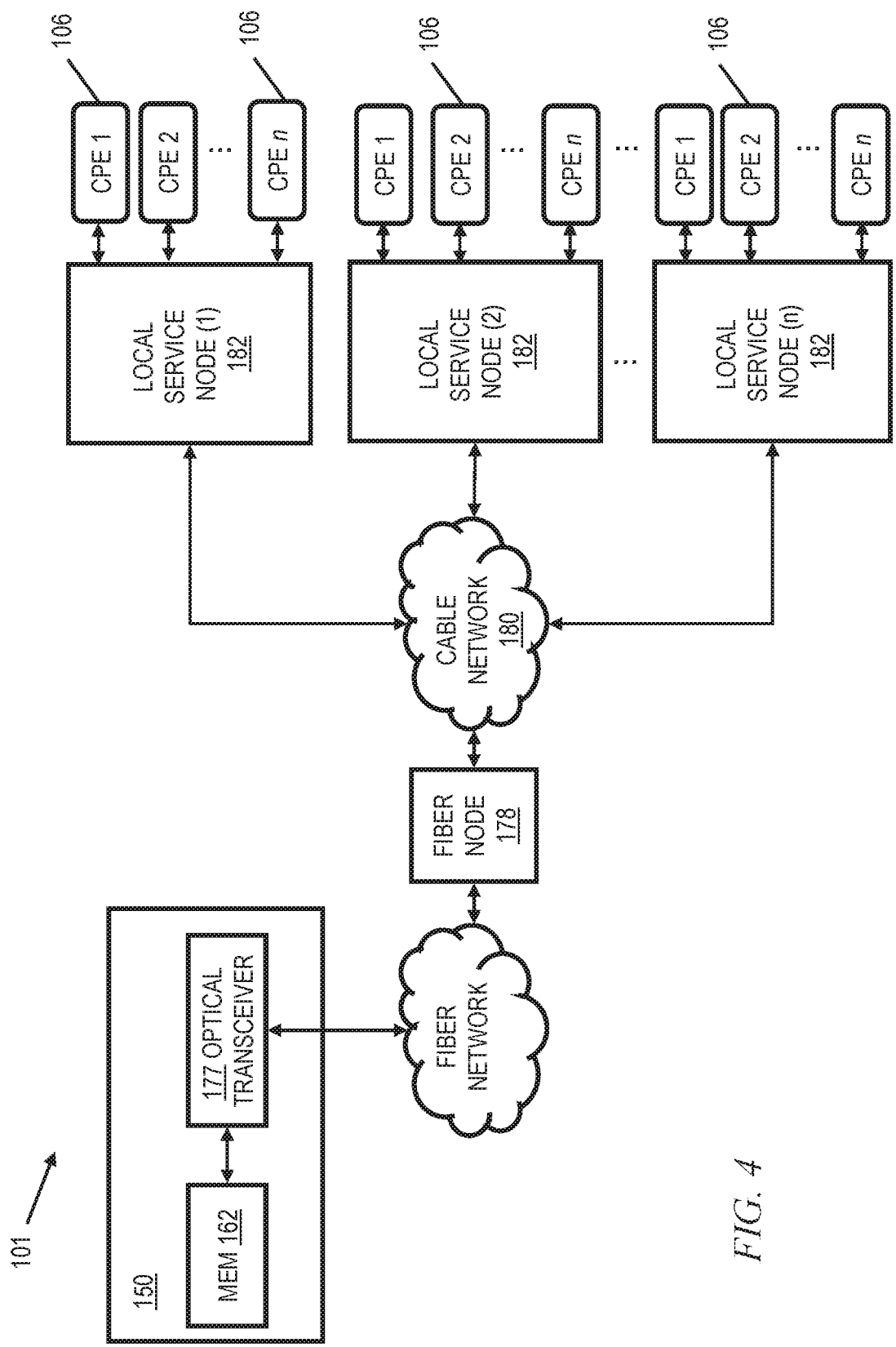
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
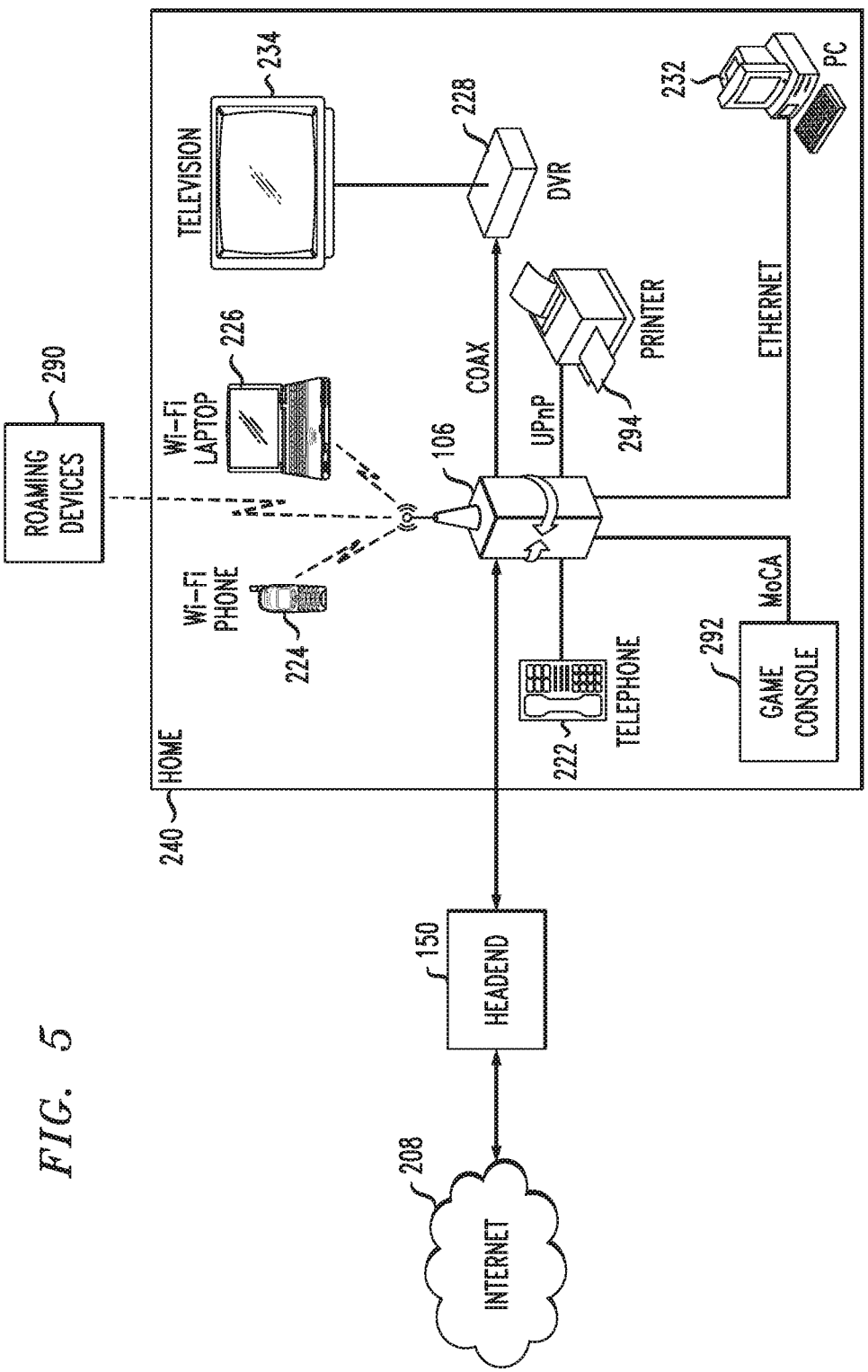
FIG. 5 is a functional block diagram of a premises network, including an exemplary centralized customer premises equipment (CPE) unit, interfacing with a head end such as that of FIG. 3.
Figure 6:
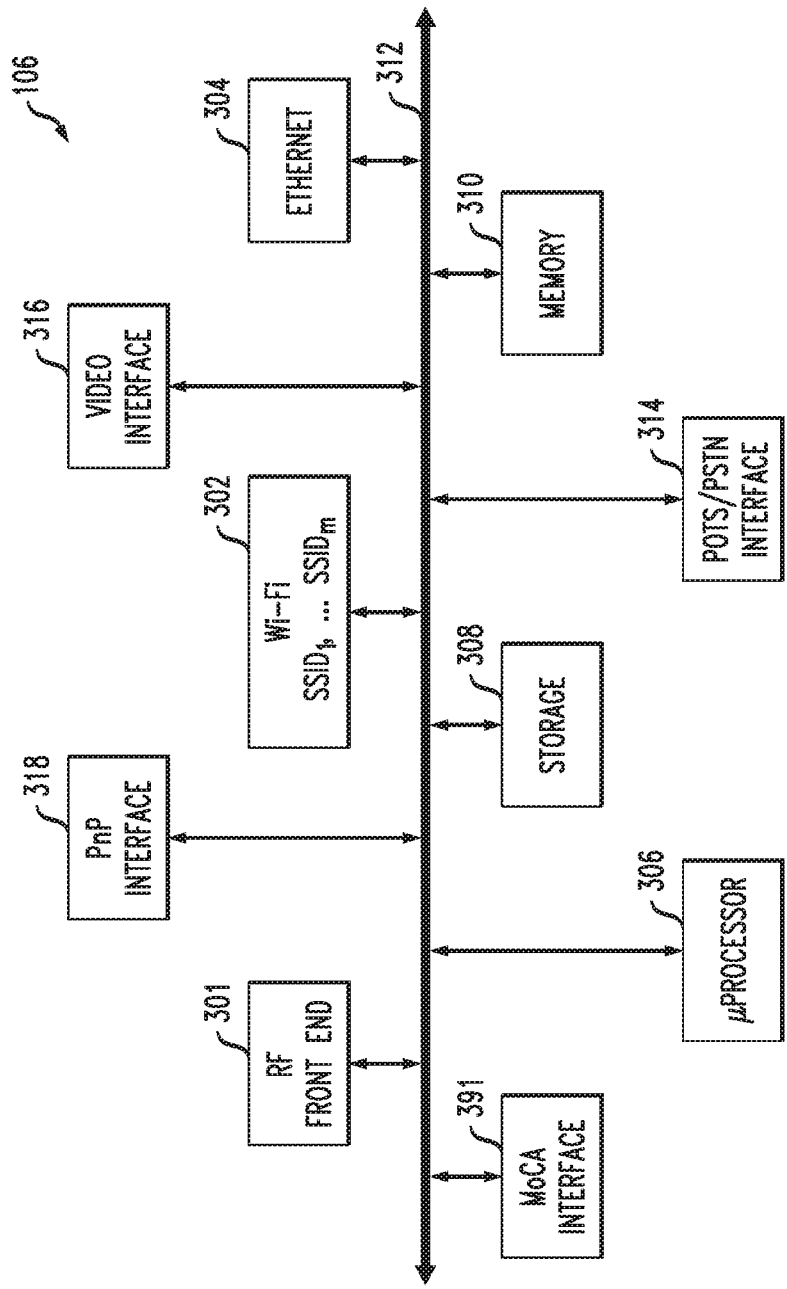
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
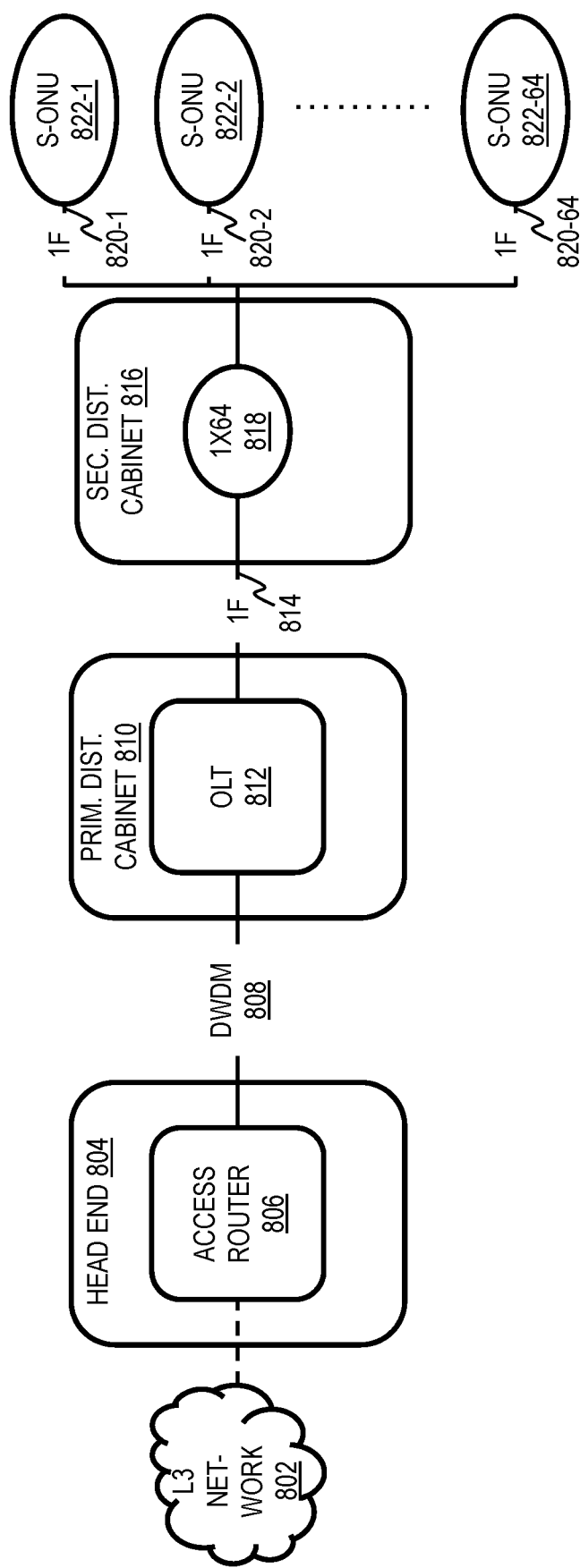
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
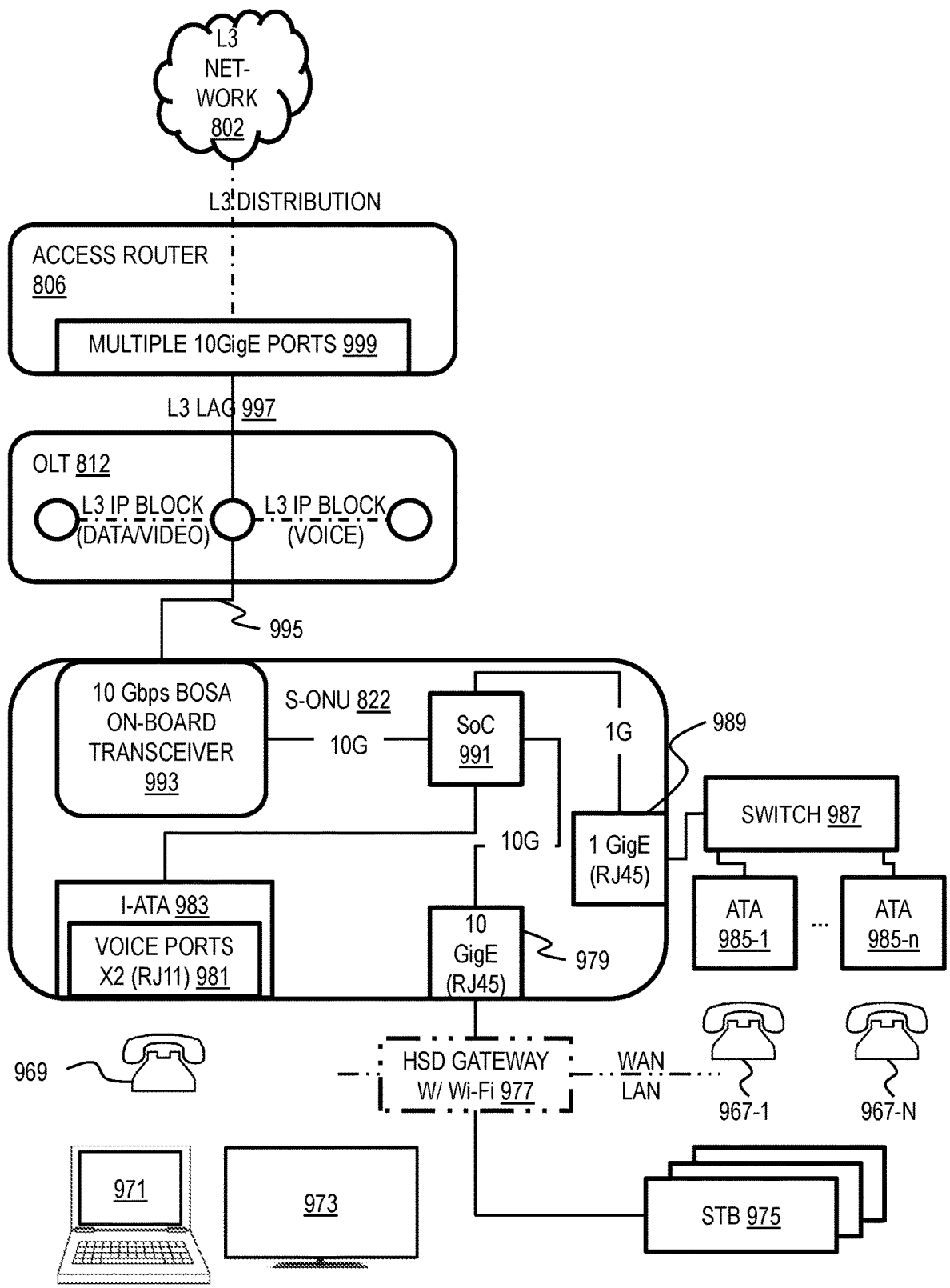
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-$n$, suitable for the needs of the business, via external analog telephone adapters (ATAs) 985-1 through 985-$n$. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Content metadata typically describes a program (e.g., a movie or an episode of a television series) as a whole, rather than individual scenes within the program. Thus, the advertisements shown to a user may not correspond to the specific content which the user is watching at that moment. Techniques of the present invention advantageously provide metadata describing particular scenes or segments within video content. This metadata can be used to select advertisements which are relevant to the specific content which a user is presently viewing. This metadata can also be combined with other sources of information to place relevant ads. Showing advertisements which are relevant to a particular scene can allow greater advertisement brand recall, immediate costumer engagement, and an increased possibility of users interacting with video content and advertising. The enhanced relevancy associated with an embodiment of the present invention provides better conversion rates, and higher revenue from each advertisement.

Figure 10:
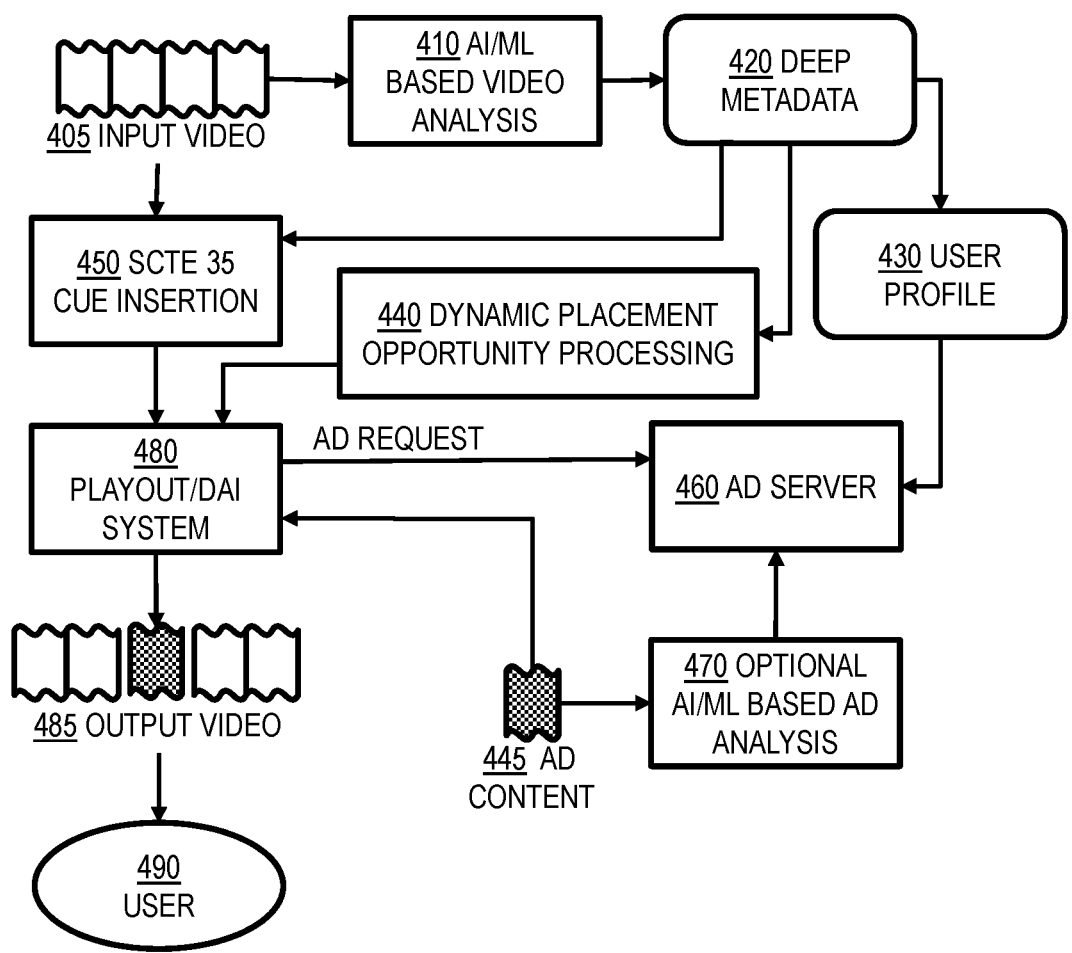
FIG. 10 is a functional block diagram of an exemplary system implementing an aspect of the invention.

FIG. 10 is a functional block diagram of an exemplary system implementing an aspect of the invention. Input video 405 may be received from a content provider, such as a television network, and/or retrieved from a content database. Input video 405 may be programming content, such a movie or television program, comprising a sequence of segments (e.g., scenes) without intervening advertisements. Module 410 performs an analysis on input video 405, e.g., using artificial intelligence (AI) and/or machine learning (ML) algorithms (e.g., scene detection and/or object detection) to extract and/or generate deep metadata 420 from the input video 405.

As previously noted, conventional content metadata describes a program (e.g., a movie or an episode of a television series) as a whole, rather than individual scenes within the program. By contrast, a given entry of deep metadata 420 describes a specific point (e.g., an image) and/or period of time (e.g., a scene or segment) within the program. A given entry of deep metadata 420 may describe an object, event, sentiment, and/or action at a specific point and/or period of time within the program, and thus may include one or timestamps, which may be in normal play time (NPT) format.

For example, deep metadata 420 determined by analysis module 410 for a given scene within input video 405 may include whether the sentiment of the scene (e.g., happy or sad); events or actions within the scene (e.g., activity or sports); background or location of the scene (e.g., mountain, urban, beach, geography, weather); and whether the scene includes any violent and/or sexually-suggestive subject matter. Deep metadata 420 determined by analysis module 410 for a given scene within input video 405 may also describe one or more objects shown in the scene. Thus, deep metadata 420 may include metadata about people shown in a scene, such as gender and/or age, and in appropriate instances, names (e.g., of actors or actresses). Deep metadata 420 may also include metadata about things shown in a scene, such as clothing, cars, buildings, and/or furniture. Deep metadata 420 may also indicate any text and/or logo present within the scene.

In an illustrative embodiment, scene and/or object recognition software within module 410 may mark a scene (and/or an object within the scene) according to a content taxonomy promulgated by the Interactive Advertising Bureau (IAB). All versions of the IAB content taxonomy, including version 2.0 released in November 2017, are expressly incorporated herein by reference in their entireties for all purposes. For example, a New York Giants® National Football League (NFL)® game could be automatically tagged with "Sports, Football, Cheerleaders, Blue, etc." This metadata 420 can be used by search and discovery systems and/or video television guide platforms.

An enhanced user profile may be built 430 based on metadata 420 from the video sequence. This profile may include entries which represent a preference or characteristic of the user and a score, which represent confidence and/or strength. For example, a user profile could indicate ("Likes sports: 90; Likes football 80; Likes golf 30; Likes children's shows 90; Likes nature videos 35.") As another example, if a user tends to watch sports events in which a specific team is playing, the user is likely a fan of that team: ("Likes sports 95; Likes basketball 90; Likes professional basketball 40; Likes college basketball 80; Likes Duke Blue Devils basketball 75.") However, the deep metadata 420 could be used to determine more granular user preferences by noting that a user tends to watch segments of shows (e.g., news or talk shows) discussing a specific topic of interest or featuring interviews with a particular guest, as opposed to watching the entire episode.

Cue insertion module 450 may receive feedback from the AI/ML based video analysis 410 to insert a cue (e.g., segmentation message) for an advertisement break at a specific time (e.g., scene location identified by analysis 410) within input video 405. Cue insertion module 450 may operate in accordance with the ANSFSCTE 35 2017 standard for Digital Program Insertion Cueing Message for Cable, promulgated by the Society of Cable Telecommunications Engineers (SCTE) and the American National Standards Institute (ANSI). All versions of the SCTE 35 standard are expressly incorporated herein by reference in their entireties for all purposes. In some embodiments, the cue itself may include the deep metadata 420. In other embodiments, the cue may be lightweight, used to coordinate timing, such that the event is marked without the deep metadata 420, but rather is marked with an identifier which be used to lookup the deep metadata 420 (e.g., as a key within a table).

Deep metadata 420 may be also be provided to dynamic placement opportunity processing module 440. Module 440 may analyze the deep metadata 420 to determine an optimal placement (e.g., specific ad creatives and/or specific advertisers) associated with a given ad break. In an illustrative embodiment, output from the dynamic placement opportunity processing 440 may augment the SCTE 35 ad breaks 450 using the aforementioned IAB content taxonomy to indicate that a given ad break may be ideal for, e.g., an airline, a soft drink, or music venue.

Playout/DAI (dynamic ad insertion) system 480 receives the input video 410 with the inserted cues 450, as well as the optimal placement determined by module 440 (and either the deep metadata 420 or the aforementioned identifier of the deep metadata). Based on the optimal placement determined by module 440, the playout/DAI system 480 sends an ad request to ad server 460. In response to the ad request, the ad server selects ad content 445 to be provided to playout/DAI system 480. Playout/DAI system 480 inserts the ad content 445 into the input video 405 at the time indicated by the SCTE 35 cue 450, thereby producing output video 485 for transmission and display to user 490.

An exemplary embodiment may also autoplay another episode or perform another action based on a predetermined tag in the video content. More specifically, an enriched trigger can automatically sense the end of the video (or other predetermined location) to perform a specified "next action," which could range from playing another episode to landing at an ad landing page or into the VOD library. The "next action" can be triggered before the end credit, after the end credits, or at any other location that is determined to be advantageous from a business perspective.

In some embodiments, ad content 445 may be processed by an optional AI/ML-based ad analysis 470, which may function in a manner similar to that discussed above with respect to video analysis 410. For example, the ad analysis 470 may identify one or more items within the aforementioned IAB content taxonomy corresponding to the ad content 445. The results of ad analysis 470 may be used by ad server 460 when selecting ad content 445 in response to the ad request from the playout/DAI system 450. For example, after a scene of input video 405 identified by video analysis 410 as showing people sitting on a beach, it may be preferable to insert ad content 445 identified by ad analysis 470 as showing people on a beach, rather than an ad for the same product (e.g., a brand of beer) which depicts people in a nightclub.

Thus, in an illustrative embodiment, automatic scene recognition and metadata generation tools integrate with placement opportunity advertising servers to systematically place metadata-enriched ad breaks at defined locations within video content. The automatic scene recognition and metadata generation tool may mark individual scenes and objects within the content using IAB taxonomy. This automatic categorization of the video content with enriched metadata may be used by search and discovery systems or video television guide platforms. The automatic scene recognition and metadata generation tool may also instruct the placement opportunity server to create ad breaks within the video content corresponding to the identified scene locations. SCTE 35 ad breaks can be augmented with IAB taxonomy providing automatic identification of optimal placement of specific ad creatives or specific advertisers associated with the ad break. These enriched ad placement calls can then be passed through an advertising platform and acted on by ad decision systems to optimize campaigns and placement of ad creatives in a manner that maximizes user reception and/or engagement. Showing advertisements which are relevant to a particular scene can allow greater advertisement brand recall, immediate costumer engagement, and an increased possibility of users interacting with video content and advertising. The enhanced relevancy associated with an embodiment of the present invention provides better conversion rates, and higher revenue from each advertisement.

In some embodiments, the video analysis 410 need not be performed at the same time, or by the same entity, as generation of the output video 485. If the input video 405 is not a live broadcast, a content distributor could obtain previously-generated deep metadata 420 (or even optimized placement 440) from a repository, which could be maintained by the content distributor or another party, such as a content provider or a third-party service provider. For example, the content distributor could query the repository to obtain deep metadata 420 for all scenes (or one or more specific scenes) within a given content item 410. Deep metadata 420 could have been generated, for example, by a content distributor during the initial live broadcast of content item 410, or by a content provider prior to the initial live broadcast of content item 410.

Figure 11:
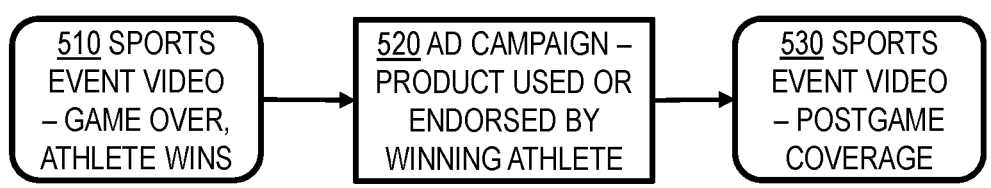
FIG. 11 shows linear advertising placement according to an aspect of the invention.

FIG. 11 shows linear advertising placement according to an aspect of the invention. 510 represents a video segment, which could be live or recorded, in which a specific athlete wins a game (or match or tournament). 520 represents an advertisement for a product used or endorsed by the athlete who has just won. In an embodiment, this advertisement because it features the athlete who has just won the game, e.g., it is selected responsive to the immediately preceding scene showing that athlete winning the game.

For example, it is not uncommon for a brand to have sponsorship deals with multiple athletes competing in a professional golf or tennis tournament. If two athletes who share a sponsor are competing against each other in the final match of a tennis tournament, that sponsor could produce respective advertisements featuring (or even congratulating) each finalist. After one of those athletes wins the match 510, the advertisements for that sponsor featuring the winner could be shown in 520. After the advertisements are shown in 520, the event video could resume with postgame coverage 530, such as presentation of a trophy to the winning athlete.

It should be noted that the advertising selection could be based not only on the scene metadata 420, but also on the enhanced user profile 430 discussed above with reference to FIG. 10. By way of example, during the annual NCAA basketball championships, many fans root for underdogs (especially schools which are not well-known) to upset highly-ranked teams (which are typically schools which belong to major athletic conferences). In 2018, for the first time ever, a 16-seeded team (UMBC) beat a 1-seeded team (Virginia) in the first round of the NCAA men's basketball championship. Even though most college basketball fans were excited by UMBC's victory, the loss was painful for Virginia fans, such as alumni of the university. As discussed above, a user profile in accordance with embodiments of the present invention could indicate whether a given viewer appears to be a fan of a specific college basketball team. Hence, after the upset, a beer brand could show most viewers an upbeat advertisement showing people loudly cheering at a bar and clinking bottles of that beer, while showing fans of the losing team a more subdued advertisement where someone comforts a friend by passing a bottle of that beer across a living room.

Figure 12:
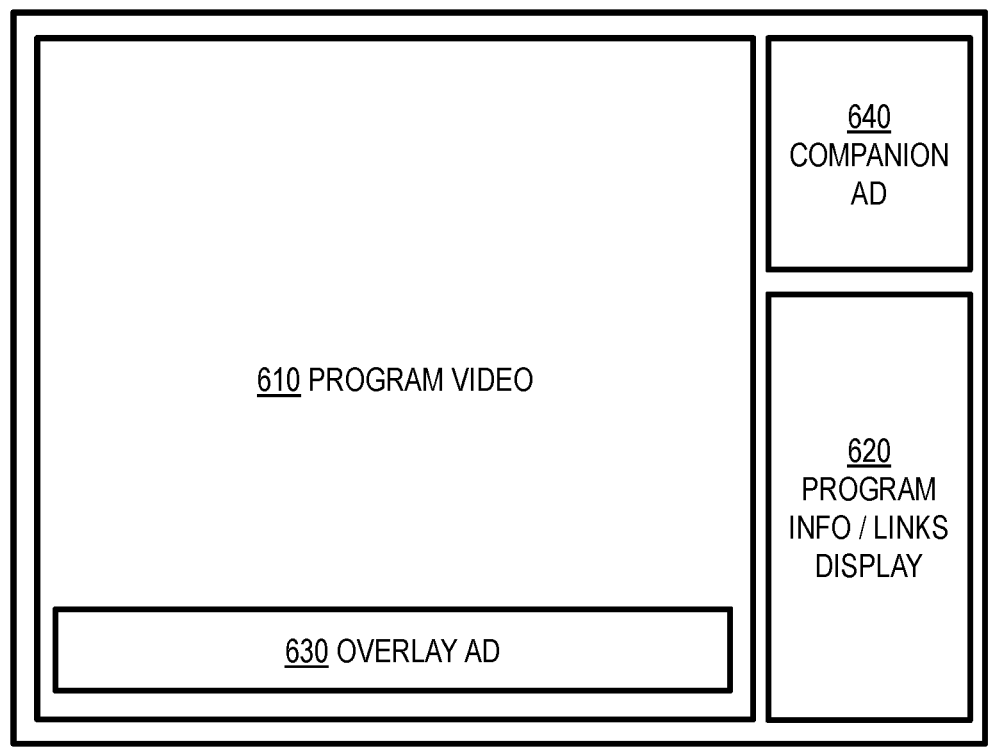
FIG. 12 shows overlay and companion advertising placement according to an aspect of the invention.

Embodiments of the present invention can be used not only for placement of linear ads after a scene, but also for ads displayed while a scene is playing, such as overlay and/or companion ads. FIG. 12 shows overlay and companion advertising placement according to an aspect of the invention. A user may be watching program video 610 on display 600, such as a television, computer, or phone. Overlay ad 630 could be displayed over a portion of the program video 610, preferably in a prominent but unobtrusive manner, such as a banner ad 630 covering a peripheral portion of the program 610. Companion ad 640 could be displayed alongside the program video 610. It is important to note that, unlike linear ad 520 discussed above with reference to FIG. 11 which is played between segments of a program, program video 610 is playing while overlay ad 630 and companion ad 640 are displayed. In some embodiments, the overlay ad 630 and companion ad 640 could both promote the same product: for example, overlay ad 630 could be a banner ad displaying the title of a film, and companion ad 640 could display the poster for that film. However, this need not be the case, and the overlay ad 630 and companion ad 640 could be completely unrelated to one another. The display 600 could also include a display of information and/or links 620 next to the program video 610, such as information about the program video 610 or a menu of links to related videos.

The overlay ad 630 and/or companion ad 640 may be selected based at least in part on deep metadata 420 describing the specific scene of the program video 610 currently displayed. For example, ads for champagne could be displayed (630/640) during a scene (610) showing guests celebrating at a wedding, while ads for facial tissues could be displayed (630/640) during a scene showing mourners crying at a funeral.

It should be noted that the advertising selection could be based not only on the scene metadata 420, but also on the enhanced user profile 430 discussed above with reference to FIG. 10. For example, the Buffalo Bills® and the Miami Dolphins® are rivals within the same division of the NFL® who play against each other each year. However, there are national brands which have sponsorship deals with both the Bills and the Dolphins. Such brands traditionally use geographic targeting—displaying ads in the Buffalo metropolitan area touting a brand as an official sponsor of the Bills, while displaying ads in the Miami metropolitan area touting that brand as an official sponsor of the Dolphins.

However, there are die-hard Bills fans who live in the Miami metropolitan area (e.g., people who grew up in or near Buffalo but now live in or near Miami). As discussed above, a user profile in accordance with embodiments of the present invention could indicate whether a given viewer appears to be a fan of a specific NFL team. For example, regardless of their location, someone who watches every Bills game, without watching other regular-season NFL games, is probably a Bills fan. Hence, in an illustrative embodiment, when a user is watching a Bills-Dolphins game (e.g., 610), users in the Miami metropolitan area could be shown ads (e.g., 630 and/or 640) touting a brand as an official sponsor of the Dolphins, except for users whose profiles suggest they are likely to be Buffalo fans, who would instead be shown ads (e.g., 630 and/or 640) touting that brand as an official sponsor of the Bills.

Recapitulation

Given the discussion thus far, it will be appreciated that, in general terms, an exemplary method for dynamic advertising insertion, according to an aspect of the invention, includes obtaining a video program comprising a sequence of segments; extracting metadata describing at least a specific one of the segments of the video program; based at least in part on the extracted metadata describing the specific segment, selecting advertising content corresponding to the specific segment; and generating an output video stream comprising the sequence of segments, wherein the selected advertising content is displayed in connection with the specific segment.

In another aspect, an exemplary method for dynamic advertising insertion includes obtaining a video program comprising a sequence of segments with respective cues therebetween; obtaining metadata describing at least a given segment of the video program; using the metadata describing the given segment to select advertising content corresponding to the given segment; and replacing a cue within the video program following the given segment with the selected advertisement content corresponding to the given segment.

In still another aspect, an exemplary system for dynamic advertising insertion includes a memory and at least one processor coupled to the memory. The processor is operative: to obtain a video program comprising a sequence of segments; to extract metadata describing at least a specific one of the segments of the video program; based at least in part on the extracted metadata describing the specific segment, to select advertising content corresponding to the specific segment; and to generate an output video stream comprising the sequence of segments, wherein the selected advertising content is displayed in connection with the specific segment.

In a further aspect, a computer program product includes a non-transitory machine-readable storage medium having machine-readable program code embodied therewith. The machine-readable program code includes machine-readable program code configured: to obtain a video program comprising a sequence of segments; to extract metadata describing at least a specific one of the segments of the video program; based at least in part on the extracted metadata describing the specific segment, to select advertising content corresponding to the specific segment; and to generate an output video stream comprising the sequence of segments, wherein the selected advertising content is displayed in connection with the specific segment.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
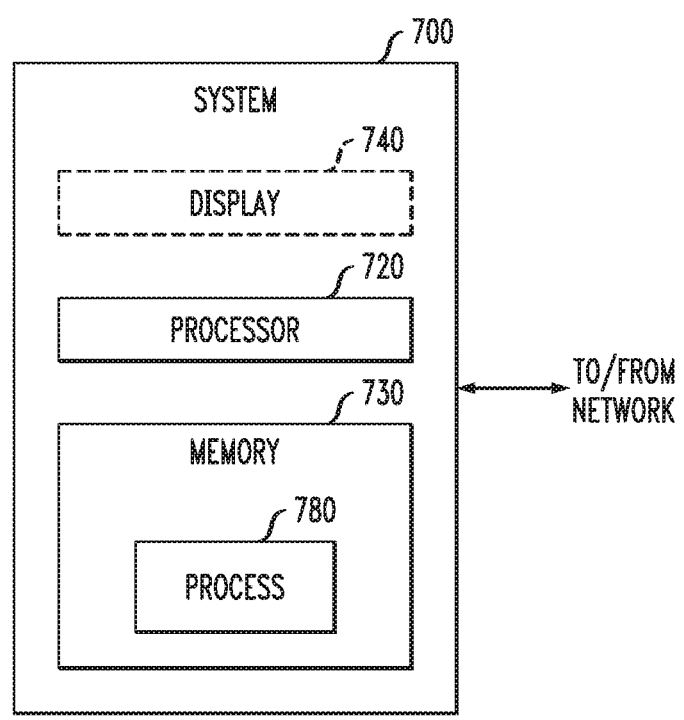
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for dynamic advertising insertion for a user, comprising:
    obtaining a video program comprising a sequence of segments;
    generating metadata describing at least a specific one of the segments of the video program;
    building an enhanced user profile of the user based on the generated metadata;
    based at least in part on the generated metadata describing the specific segment and the enhanced user profile built based on the generated metadata, selecting advertising content corresponding to the specific segment; and
    generating an output video stream comprising the sequence of segments, wherein the selected advertising content is displayed to the user in connection with the specific segment;
    wherein generating the metadata comprises at least scene detection using at least one of artificial intelligence and machine learning; and
    wherein the selected advertising content is inserted into the output video stream between the specific segment and another segment;
    further comprising determining, using the generated metadata, a preference of said user to watch said specific segment of the video program as opposed to the entire video program, wherein the profile is updated based at least in part on the preference and the specific segment is selected based on the preference of said user to watch said specific segment as opposed to the entire video program.

2. The method of claim 1, wherein at least the specific segment comprises an image corresponding to a point of time within the video program.

3. The method of claim 1, wherein at least the specific segment comprises a scene corresponding to a period of time within the video program.

4. The method of claim 1, wherein the metadata indicates at least one object, person, location, event, or action shown within at least a portion of the specific segment.

5. The method of claim 1, wherein the metadata indicates at least one sentiment or emotion corresponding to at least a portion of the specific segment.

6. The method of claim 1, wherein selecting the advertising content comprises using the profile of the given user to anticipate an emotional response of the given user to the specific segment.

7. The method of claim 1, wherein the profile of the given user comprises a probability that the given user supports a first team, further comprising selecting the advertising content to be favorable to the first team, despite the given user being geographically located in a region associated with a second team different than the first team.

8. The method of claim 1, wherein the video program further comprises respective cues between the segments, and wherein a cue between the specific segment and another segment is replaced in the output video stream with the selected advertising content corresponding to the specific segment.

9. The method of claim 1, wherein extracting the metadata describing at least the specific segment comprises determining a time within the video program at which the specific segment ends.

10. The method of claim 9, further comprising inserting a cue corresponding to the specific segment within the video program at the determined time at which the specific segment ends, wherein generating the output video stream comprises replacing the cue corresponding to the specific segment with the selected advertising content corresponding to the specific segment.

11. The method of claim 1, wherein selecting the advertising content corresponding to the specific segment comprises determining that at least a portion of the advertising content shows at least one object, person, or location which is also shown in at least a portion of the specific segment.

12. A system for dynamic advertising insertion for a user, comprising:
    a memory; and
    at least one processor coupled to the memory, the processor being operative:
        to obtain a video program comprising a sequence of segments;
        to generate metadata describing at least a specific one of the segments of the video program;
        to build an enhanced user profile of the user based on the generated metadata;
        based at least in part on the generated metadata describing the specific segment and the enhanced user profile built based on the generated metadata, to select advertising content corresponding to the specific segment; and
        to generate an output video stream comprising the sequence of segments, wherein the selected advertising content is displayed to the user in connection with the specific segment;
    wherein generating the metadata comprises at least scene detection using at least one of artificial intelligence and machine learning; and
    wherein the selected advertising content is inserted, by the processor, into the output video stream between the specific segment and another segment;
    wherein the at least one processor is further operative to determine, using the generated metadata, a preference of said user to watch said specific segment of the video program as opposed to the entire video program, wherein the profile is updated based at least in part on the preference and the specific segment is selected based on the preference of said user to watch said specific segment as opposed to the entire video program.

13. A computer program product comprising a non-transitory machine-readable storage medium having machine-readable program code for dynamic advertising insertion for a user embodied therewith, said machine-readable program code comprising machine-readable program code configured:

to obtain a video program comprising a sequence of segments;

to generate metadata describing at least a specific one of the segments of the video program;

to build an enhanced user profile of the user based on the generated metadata;

based at least in part on the generated metadata describing the specific segment and the enhanced user profile built based on the generated metadata, to select advertising content corresponding to the specific segment; and to generate an output video stream comprising the sequence of segments, wherein the selected advertising content is displayed to the user in connection with the specific segment;

wherein generating the metadata comprises at least scene detection using at least one of artificial intelligence and machine learning; and wherein the selected advertising content is inserted, by the processor, into the output video stream between the specific segment and another segment;

wherein the machine-readable program code is further configured to determine, using the generated metadata, a preference of said user to watch said specific segment of the video program as opposed to the entire video program, wherein the profile is updated based at least in part on the preference and the specific segment is selected based on the preference of said user to watch said specific segment as opposed to the entire video program.

14. The method of claim 10, wherein the inserted cue includes the generated metadata, and wherein the metadata indicates at least one of:

at least one object, person, location, event, or action shown within at least a portion of the specific segment; and at least one sentiment or emotion corresponding to at least a portion of the specific segment.

15. The method of claim 10, wherein the inserted cue does not include the generated metadata, but includes an identifier permitting lookup of the metadata, and wherein the metadata indicates at least one of:

at least one object, person, location, event, or action shown within at least a portion of the specific segment; and at least one sentiment or emotion corresponding to at least a portion of the specific segment.

16. The method of claim 10, wherein said scene detection comprises marking said specific segment with a content taxonomy, wherein selecting advertising content corresponding to the specific segment comprises using at least one of artificial intelligence and machine learning to select said advertising content based on matching said content taxonomy.

17. The method of claim 16, further comprising augmenting said inserted cue with said content taxonomy.

* * * * *